US012700515B2

(12) United States Patent
Guler et al.

(10) Patent No.: US 12,700,515 B2
(45) Date of Patent: Aug. 4, 2026

(54) FUEL CLADDING COVERED BY A MESH

(71) Applicant: Westinghouse Electric Company LLC, Cranberry Township, PA (US)

(72) Inventors: Cenk Guler, Irwin, PA (US); Kathryn E. Metzger, Columbia, SC (US); Benjamin R. Maier, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/662,692

(22) Filed: May 10, 2022

(65) Prior Publication Data

US 2023/0368931 A1 Nov. 16, 2023

(51) Int. Cl.
*G21C 3/07* (2006.01)
*G21C 3/20* (2006.01)

(52) U.S. Cl.
CPC *G21C 3/20* (2013.01); *G21C 3/07* (2013.01)

(58) Field of Classification Search
CPC .................................... G21C 3/20; G21C 3/07
See application file for complete search history.

(56) References Cited

U.S. PATENT DOCUMENTS 3,625,822 A * 12/1971 Mantle .................. G21C 3/324 376/454
3,930,941 A * 1/1976 Meerwald ................ G21C 3/08 976/DIG. 45
4,224,106 A * 9/1980 Delafosse ................ G21C 3/36 376/416
4,728,488 A * 3/1988 Gillett .................... B23K 9/048 219/76.13
5,171,520 A * 12/1992 Bryan ....................... C23C 4/10 376/415
5,373,541 A 12/1994 Mardon et al.
5,434,896 A * 7/1995 Bryan ....................... C23C 4/10 376/415

(Continued)

FOREIGN PATENT DOCUMENTS

CN 106104699 B 2/2018
CN 107731316 A * 2/2018 ............... G21C 3/07

(Continued)

OTHER PUBLICATIONS

International Search Report and Opinion for corresponding International Application No. PCTUS2023021694, mailed Jan. 19, 2024.

(Continued)

*Primary Examiner* — Lily C Garner
(74) *Attorney, Agent, or Firm* — K&L Gates LLP

(57) ABSTRACT

In various aspects, a nuclear fuel rod cladding is disclosed. The cladding can include a base tube and a mesh structure including gaps therein. The base tube can include an elongated tubular wall and can be configured to house nuclear fuel therein. The mesh structure can be positioned along at least a portion of the elongated tubular wall and can be configured to provide structural support to the base tube. In one aspect, the gaps of the mesh structure are designed to permit neutrons emitted by the nuclear fuel to pass therethrough to escape the fuel rod cladding.

11 Claims, 6 Drawing Sheets

(56) References Cited

U.S. PATENT DOCUMENTS

| | | | | | |
|---|---|---|---|---|---|
| 5,761,263 | A * | 6/1998 | Uetake | G21C 3/06 376/457 |
| 6,813,329 | B1 * | 11/2004 | Byers | G21C 3/06 376/454 |
| 9,911,511 | B2 * | 3/2018 | Ledford | G21C 3/07 |
| 10,020,078 | B2 | 7/2018 | Pop | |
| 10,102,930 | B2 * | 10/2018 | Pop | G21C 21/02 |
| 10,593,434 | B2 | 3/2020 | Lahoda | |
| 11,306,384 | B2 * | 4/2022 | Scott | C23C 4/123 |
| 11,443,857 | B2 * | 9/2022 | Lahoda | C23C 24/082 |
| 12,278,017 | B2 * | 4/2025 | Lahoda | C23C 4/131 |
| 12,421,593 | B2 * | 9/2025 | Lahoda | C23C 14/024 |
| 2012/0051489 | A1 * | 3/2012 | Varanasi | F28F 13/182 165/185 |
| 2013/0251087 | A1 * | 9/2013 | Short | C25D 11/00 427/523 |
| 2014/0126683 | A1 * | 5/2014 | Mazzoccoli | G21C 21/02 376/416 |
| 2014/0254740 | A1 * | 9/2014 | Ledford | G21C 3/07 427/6 |
| 2022/0384062 | A1 * | 12/2022 | Lahoda | C23C 14/165 |
| 2024/0212870 | A1 * | 6/2024 | Lahoda | C23C 28/32 |

FOREIGN PATENT DOCUMENTS

| | | | | | |
|---|---|---|---|---|---|
| CN | 208027756 | U | * | 10/2018 | |
| CN | 113035384 | | * | 6/2021 | G21C 3/06 |
| CN | 113035384 | A | * | 6/2021 | G21C 21/00 |
| CN | 114082803 | B | * | 10/2024 | B23D 75/00 |
| DE | 19834041 | A1 | * | 2/2000 | G21C 3/08 |
| EP | 614195 | A1 | * | 9/1994 | G21C 3/07 |
| EP | 4213161 | A1 | * | 7/2023 | G21C 3/06 |
| GB | 797608 | A | * | 7/1958 | |
| GB | 980395 | A | * | 1/1965 | |
| GB | 984156 | A | * | 2/1965 | |
| GB | 1089168 | A | * | 11/1967 | |
| JP | H01195391 | A | * | 8/1989 | |
| JP | 10142364 | A | * | 5/1998 | |
| WO | WO-2015039636 | A1 | * | 3/2015 | G21C 3/07 |

OTHER PUBLICATIONS

Search Report from corresponding Taiwan Application No. 112117248 mailed May 31, 2025.

* cited by examiner

FUEL CLADDING COVERED BY A MESH

GOVERNMENT CONTRACT

This invention was made with government support under Contract No. DE-NE0009033 awarded by the Department of Energy. The government has certain rights in the invention.

FIELD

The present disclosure is generally related to nuclear fuel rod claddings, and more particularly, to fuel rod claddings including mesh structures, porous structures, coatings, or a combination thereof. In some aspects, the mesh structures, porous structures, and coatings can help to control the oxidation of the cladding tube, help to maintain the structural integrity of the cladding tube, and/or help to limit the neutronic penalty imposed by the cladding.

SUMMARY

The following summary is provided to facilitate an understanding of some of the innovative features unique to the aspects disclosed herein, and is not intended to be a full description. A full appreciation of the various aspects disclosed herein can be gained by taking the entire specification, claims, and abstract as a whole.

In various aspects, a nuclear fuel rod cladding is disclosed. In some aspects, the cladding includes a base tube and a mesh structure including gaps therein. The base tube can include an elongated tubular wall and can be configured to house nuclear fuel therein. The mesh structure can be positioned along at least a portion of the elongated tubular wall and can be configured to provide structural support to the base tube. In one aspect, the gaps of the mesh structure are designed to permit neutrons emitted by the nuclear fuel to pass therethrough to escape the fuel rod cladding.

In various aspects, a method for manufacturing a nuclear fuel rod cladding is disclosed. In some aspects, the method includes: providing a base tube including an elongated tubular wall. The elongated tubular wall can have an outer surface and the base tube can be configured to house nuclear fuel therein. The method can further include forming a mesh structure on the outer surface of the elongated tubular wall. The mesh structure can be configured to provide structural support to the base tube.

In various aspects, a nuclear fuel rod cladding is disclosed. In some aspects, the cladding includes a base tube and a porous layer including gaps therein. The base tube can include an elongated tubular wall and can be configured to house nuclear fuel therein. The porous layer can be positioned along at least a portion of the elongated tubular wall and can be configured to provide structural support to the base tube. In one aspect, the gaps of the porous layer are designed to permit neutrons emitted by the nuclear fuel to pass therethrough to escape the fuel rod cladding.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Figure 1:
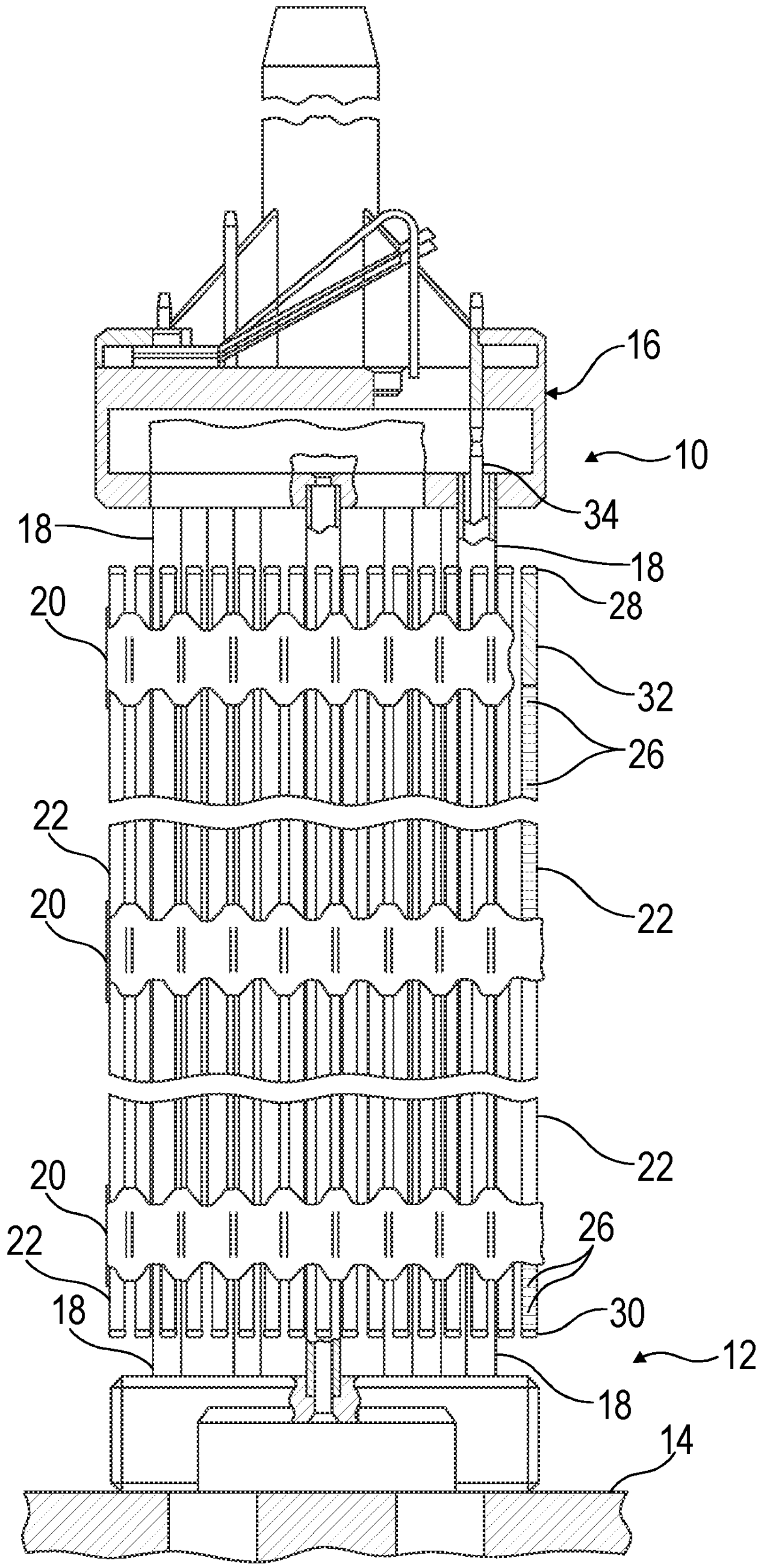
FIG. 1 illustrates a cross-sectional elevation view of a fuel assembly, according to at least one non-limiting aspect of this disclosure.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

In a typical nuclear reactor, such as a pressurized water reactor (PWR), heavy water reactor (e.g., a CANDU), or a boiling water reactor (BWR), the reactor core can include a large number of fuel assemblies, each of which includes a plurality of elongated fuel elements or fuel rods. For example, FIG. 1 illustrates a cross-sectional elevation view of a fuel assembly 10, according to at least one non-limiting aspect of this disclosure. The fuel assembly 10 includes an organized array of elongated fuel rods 22. The fuel rods 22 can house a plurality of fuel pellets 26 each comprising a fissile material capable of creating the reactive power of the reactor through fission reactions.

The fuel rods 22 may be supported by one or more transverse grids 20 which attach to guide thimbles 18. The guide thimbles 18 extend longitudinally between top nozzle 16 and bottom nozzle 12 and are configured for control rods 34 to operably move therethrough. Opposite ends of the guide thimbles 18 can attach to the top nozzle 16 and bottom nozzle 12, respectively. The bottom nozzle 12 can be configured to support the fuel assembly 10 on a reactor vessel lower core plate 14 in the core region of a reactor (not shown). A liquid coolant such as water, or water including a neutron absorbing material such as boron, may be pumped to the fuel assembly 16 upwardly through a plurality of flow openings in the lower core plate 14. The bottom nozzle 12 of the fuel assembly 10 may pass the coolant flow to and along the fuel rods 22 of the assembly 10 in order to extract heat generated as a result of the fission reactions occurring therein.

Figure 2:
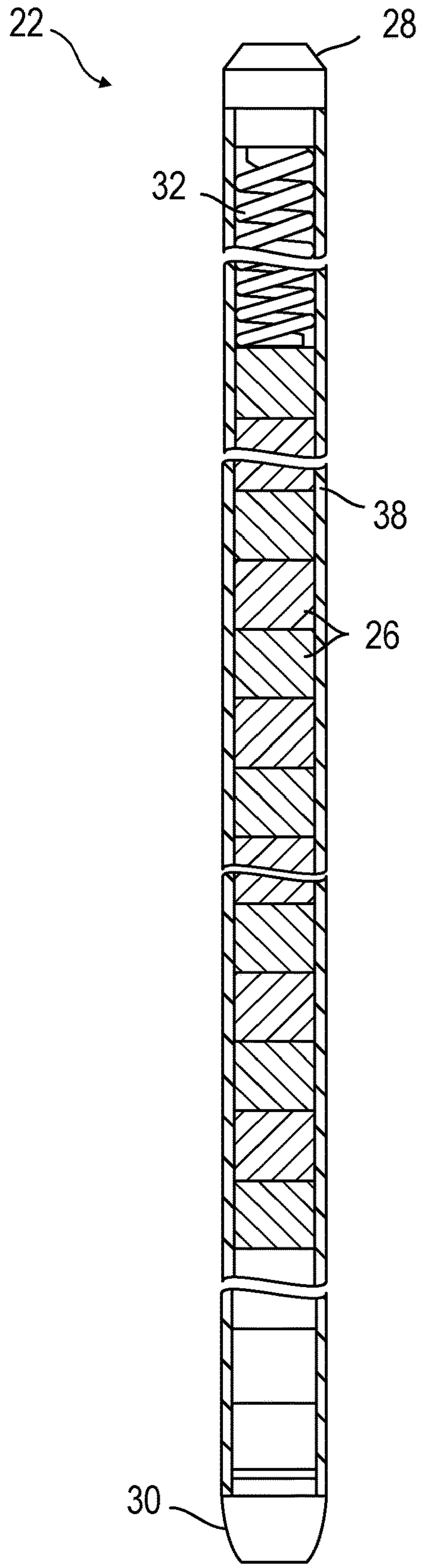
FIG. 2 illustrates a cross-sectional view of a fuel rod, according to at least one non-limiting aspect of this disclosure.

FIG. 2 illustrates an enlarged cross-sectional view of a fuel rod 22, according to at least one non-limiting aspect of this disclosure. Referring now to FIGS. 1-2, as mentioned above, each of the fuel rods 22 may include a plurality of nuclear fuel pellets 26. The fuel pellets 26 are housed within an elongated cladding 38 tube that is closed at opposite ends by an upper end plug 28 and a lower end plug 30. The pellets 26 may be maintained in a stack by a plenum spring 32 disposed between the upper end plug 28 and the top of the pellet stack. However, in other aspects, the pellets 26 may be otherwise configured via alternate mechanisms.

In various aspects, the fuel pellets 26 may comprise a fissile material capable of creating the reactive power of the reactor through fission reactions. For example, the fissile material may include uranium dioxide ($UO_2$), plutonium dioxide ($PuO_2$), thorium dioxide ($ThO_2$), uranium nitride (UN), uranium silicide ($U_3Si_2$), or mixtures thereof. The fuel pellets 26 may also include a neutron absorbing material such as boron or boron compounds, gadolinium or gadolinium compounds, erbium or erbium compounds, or a combination thereof. However, in other aspects, the pellets 26 can include a variety of suitable materials capable of generating and/or controlling reactive power.

In various aspects, the cladding 38 tube may comprise a material including zirconium (Zr), iron (Fe), or combinations thereof. For example, the cladding 38 tube may be constructed of a zirconium (Zr) alloy that includes other metals such as niobium (Nb), tin (Sn), iron (Fe), and/or chromium (Cr).

The cladding 38 of the fuel rods 22 operates in a harsh environment. For example, the cladding 38 can be exposed to temperatures up to 1200° C. under normal operating conditions and potentially even higher temperatures under accident conditions. Moreover, as fission reactions occur inside the fuel rods 22, fission gasses are produced. These fission gasses can build up pressure inside the fuel rods 22 and cause a force to be exerted against the internal surface of the cladding 38 tube.

The external surface of the cladding 38 tube is also subject to harsh conditions. For example, external pressure is exerted against the cladding 38 as it is immersed in the liquid coolant. Additionally, reactions with oxygen and hydrogen atoms included in the chemistry of the liquid coolant can cause the cladding 38 material (e.g. zirconium alloy) to oxidize and deteriorate over time. As oxidation progresses, the structural integrity of the cladding 38 tube can weaken. Eventually, portions of the cladding 38 tube can oxidize and weaken to the point where rupture occurs.

Additional factors may drive the cladding 38 tube to rupture. For example, as mentioned above, fission gasses can build up pressure inside the fuel rods 22. Under normal conditions, the external pressure exerted by the liquid coolant can help to counteract the internal fission gas pressure. However, if the external pressure is removed by a loss of coolant event, then the internal fission gasses may drive a deteriorated (e.g., from oxidation) cladding 38 tube to rupture. Moreover, increased temperatures and/or exposure to steam caused by the loss of coolant event can accelerate the oxidation process.

Rupture of the cladding 38 tube can lead to a variety of problems. For example, liquid coolant (e.g., water) may enter the cladding 38 tube at the rupture point. Exposure of the fuel pellets 26 (e.g., $UO_2$) to water can cause the release of additional gasses, such as hydrogen, which can cause further degradation of the cladding 38 tubes. Moreover, extensive cleanup activities may be required if fuel pellet(s) 26 or portions thereof are released into the liquid coolant as a result of a rupture. Yet further, if the magnitude of a rupture and/or ruptures is severe, the structural integrity of the fuel rods 22 and/or the fuel assembly 10 may be weakened. Thus, there is a need for devices, systems, and methods for controlling oxidation of the fuel rod cladding and/or improving the structural integrity of the fuel rod cladding to help prevent ruptures from occurring and to minimize the damage caused when ruptures do occur.

Figure 3:
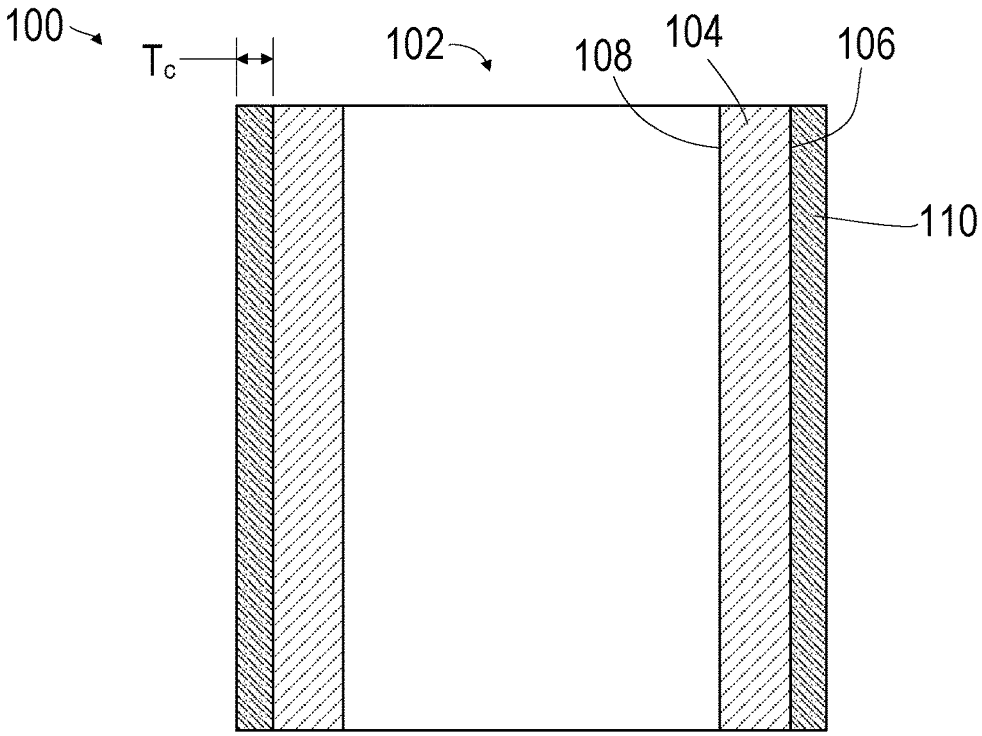
FIG. 3 illustrates longitudinal cross-sectional view of a portion of a nuclear fuel rod cladding including a base tube and an oxidation-resistant coating, according to at least one non-limiting aspect of this disclosure.

FIG. 3 illustrates longitudinal cross-sectional view of a portion of a nuclear fuel rod cladding 100 including a base tube 102 and an oxidation-resistant coating 110, according to at least one non-limiting aspect of this disclosure. The base tube 102 may be constructed from materials similar to those disclosed above with respect to cladding 38. For example, the base tube 102 may include zirconium (Zr) and/or other metals such as niobium (Nb), tin (Sn), iron (Fe), and chromium (Cr). In various aspects, the base tube 102 can include a zirconium (Zr) alloy. The zirconium (Zr) alloy can include niobium (Nb), tin (Sn), iron (Fe), and/or chromium (Cr).

The base tube 102 can include an elongated tubular wall 104 having an inner surface 108 and an outer surface 106. The oxidation-resistant coating 110 is formed on the outer surface 106 of the tubular wall 104 to protect the base tube 102 from oxidation that can occur as a result of exposure to the liquid coolant. Thus, the oxidation-resistant coating 110 can also help to maintain the structural integrity of the cladding 100 by preventing and/or slowing the deterioration of the tubular wall 104 of the base tube 102.

The oxidation-resistant coating 110 may be constructed from any suitable oxidation-resistant material. For example, the oxidation-resistant coating 110 can include chromium (Cr), iron (Fe), yttrium (Y), and/or aluminum (Al) and/or alloys of any combination thereof. Further, the oxidation-resistant coating 110 may be applied to the base tube 102 using various surface treatment technologies such as, for example, cold spray, thermal spray, physical vapor deposition (PVD), slurry coating, etc.

The oxidation-resistant coating 110 can have a thickness $T_c$. In some aspects, the thickness $T_c$ of the coating 110 can be in a range of 5 microns to 100 microns, such as, for example 10 microns, 15 microns, 20 microns, 25 microns, 30 microns, 35 microns, 40 microns, 45 microns, or 50 microns. In other aspects, the thickness $T_c$ of the coating 110 can be greater than 100 microns.

The thickness $T_c$ of the oxidation-resistant coating 110 may be optimized based on a variety of considerations. For example, various coating 110 materials such as, for example, chromium (Cr) can be a neutron absorber in addition to being an oxidation-resistant material. Thus, the coating 110 can impose a neutronic penalty that can negatively affect the efficiency of the reactor. Further, a coating 110 with a greater thickness $T_c$ may impose a greater neutronic penalty. Accordingly, it may be desirable to apply a very thin oxidation-resistant coating 110 (e.g., $T_c$ no greater than 20 microns, no greater than 15 microns, or no greater than 10 microns) to limit the neutronic penalty imposed by the coating 110. However, achieving a very thin oxidation-resistant coating 110 layer can be difficult depending on the treatment technology used to apply the coating 110. Moreover, a very thin coating 110 may be less effective at preventing oxidation and ensuring the structural integrity of the base tube 102 compared to thicker coatings. Accordingly, there is a need for coatings and/or other surface treatments that can provide oxidative resistance and structural support to the base tube 102 while imposing less of a neutronic penalty.

Figure 4:
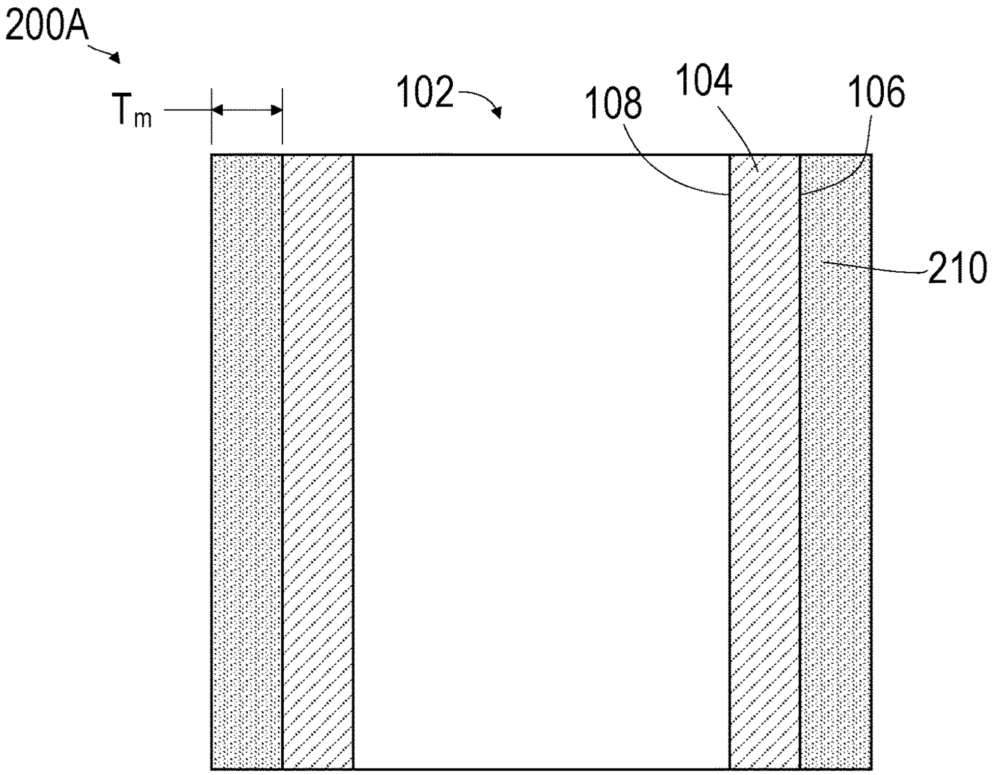
FIG. 4 illustrates a longitudinal cross-sectional view of a portion of a nuclear fuel rod cladding including a base tube and a mesh structure, according to at least one non-limiting aspect of this disclosure.

FIG. 4 illustrates a longitudinal cross-sectional view of a portion of a nuclear fuel rod cladding 200A including a base tube 102 and a mesh structure 210, according to at least one non-limiting aspect of this disclosure. Similar to the oxidation-resistant coating 110 of FIG. 3, the mesh structure 210 is formed on the outer surface 106 of the tubular wall 104. However, according to the non-limiting aspect of FIG. 4, and unlike the oxidation-resistant coating 110 of FIG. 3, the mesh structure 210 does not coat the entire outer surface 106 of the tubular wall 104. Instead, the mesh structure 210 can include gaps formed therein (not shown in FIG. 4) that selectively leave portions of the outer surface 106 of the tubular wall 104 uncovered by the mesh structure 210.

Figures 8, 9, 10:
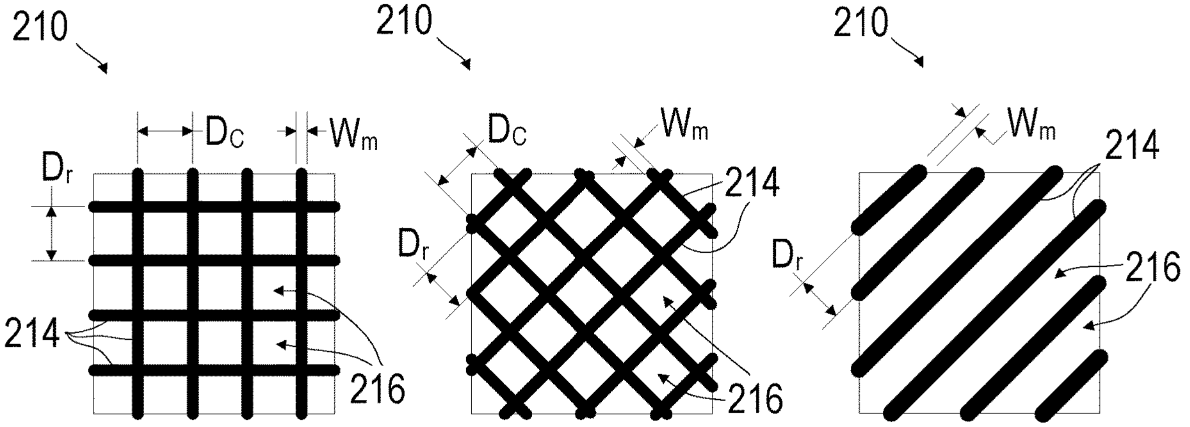
FIGS. 8-10 illustrate various examples of mesh structure patterns having gaps formed therein, according to several non-limiting aspects of this disclosure.

For example, FIGS. 8-10 illustrate various examples of mesh structure 210 patterns having gaps 216 formed therein. FIG. 8 depicts a rectangular mesh pattern, FIG. 9 depicts a diamond mesh pattern, and FIG. 10 depicts a spiral mesh pattern. Each of the mesh structures 210 includes a plurality of mesh segments 214 forming the various patterns. The mesh segments 214 are configured such that gaps 216 are formed therebetween. Thus, referring again to FIG. 4, and also to FIGS. 8-10, the mesh segments 214 cover portions of the outer surface 106 of the tubular wall 104 while remaining portions of the outer surface 106 of the tubular wall 104 are exposed by the gaps 216. Although rectangular, diamond, and spiral patterns are depicted in FIGS. 8-10, the mesh structure 210 may be formed in any suitable pattern (e.g. triangular, pentagonal, hexagonal, non-structured, etc.).

Alternatively, a suitable mesh structure may include more than one type of gap pattern. For example, a mesh structure may include a first pattern and a second pattern different from the first pattern. Also, in some implementations, a mesh structure can include a random pattern. In at least one example, the mesh structure can define a porous layer with a predetermined porosity.

Still referring to FIG. 4, and also to FIGS. 8-10, in some aspects, the mesh structure 210 may be constructed from any suitable oxidation-resistant material. For example, the mesh structure 210 can be constructed from materials similar to the oxidation-resistant coating 110 of FIG. 3, such as chromium (Cr), iron (Fe), yttrium (Y), and/or aluminum (Al) and/or alloys of any combination thereof.

Still referring to FIG. 4, and also to FIGS. 8-10, the mesh structure 210 can have a thickness $T_m$. In some aspects, the thickness $T_m$ of the mesh structure 210 can be in a range of 5 to 100 microns, such as, for example 5 microns, 10 microns, 15 microns, 20 microns, 25 microns, 30 microns, 35 microns, 40 microns, 45 microns, or 50 microns. In other aspects, the thickness $T_m$ of the mesh structure 210 can be greater than 100 microns.

Still referring to FIG. 4, and also to FIGS. 8-10, the mesh segments 214 can have a width $W_m$. In some aspects, the width $W_m$ of the mesh segments 214 can be in a range of 0.1 mm to 5 mm, such as a range of 0.5 mm to 3 mm. For example, the mesh segments 214 can have width $W_m$ of 0.5 mm, 0.6 mm. 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or 3.0 mm. In some aspects, each of the mesh segments 214 can have the same or about the same width $W_m$. In other aspects, mesh segments 214 of the same mesh structure 210 can have different widths $W_m$. For example, perpendicular mesh segments may have different widths $W_m$, alternating rows and/or columns of mesh segments may have different widths $W_m$, different portions along the elongated length of the cladding 200 may have mesh segments with different widths $W_m$, etc.

The distance between the mesh segments 214 can be selected to control the size of the gaps 216. For example, in the non-limiting aspects of FIGS. 8-9, rows of the mesh segments 214 can be spaced at a distance $D_r$ and columns of the mesh segments 214 distance $D_c$. As another example, in the non-liming aspect of FIG. 10, rows of the mesh segments 214 can be spaced at a distance $D_r$. In some aspects, the distances $D_r$, $D_c$ between various rows and/or columns of the mesh structure 210 can be the same or about the same across the entire mesh structure 210. In other aspects, the distances $D_r$, $D_c$ between the various rows and/or columns of the mesh structure can be different.

As mentioned above, materials used to construct the oxidation-resistant coating 110, such as chromium (Cr), can be neutron absorbers. Similar materials may be used to construct the mesh structure 210. Thus, the mesh structure 210 can also have neutron absorbing properties. However, the mesh structure 210 can include gaps 216 that allow portions of the external surface 106 of the tubular wall 104 to remain uncovered by the mesh segments 214. Neutrons emitted by nuclear fuel contained within the cladding 200A can escape the cladding 200A by passing through the tubular wall 104 of the base tube 102 and through gaps 216 in the mesh structure 210. In other words, the gaps 216 provide a path for at least some neutrons to escape the cladding 200A without needing to pass through the material of the mesh structure 210. Accordingly, the widths $W_m$ of the mesh segments 214 and/or the distances (e.g., $D_r$, $D_c$) between the mesh segments 214 may be optimized to control the neutronic penalty imposed by the mesh structure 210. Moreover, because some neutrons escaping the base tube 102 can encounter the mesh segments 214, the thickness $T_m$ can also be optimized to control the neutronic penalty imposed by the mesh structure 210. A person skilled in the art will appreciate that the mesh structure 210 can be configured to impose a lower overall neutronic penalty compared to the oxidation-resistant coating 110 described above, even in some cases where the mesh structure 210 thickness $T_m$ is greater than the coating 110 thickness $T_c$.

Furthermore, as explained above, exposure of the base tube 102 to liquid coolant can cause the tubular wall 104 to deteriorate overtime. This deterioration, along with the pressure of fission gasses exerting a force against the internal surface 108 of the tubular wall 104, can cause the cladding base tube 102 to rupture. The mesh structure 210 can serve to protect the portions of the external surface 106 of the tubular wall 104 that are covered by the mesh segments 214 from oxidation. The mesh structure 210 can also help limit oxidation of the base tube 102 to the areas of the external surface 106 of the tubular wall 104 that are left uncovered by the gaps 216. Thus, the mesh structure 210 can help to prevent the formation of large, rupture-prone oxidized areas on the tubular wall 104. Moreover, where rupture does occur, the mesh structure 210 can provide additional strength to hold the base tube 102 together and help prevent larger rupture holes from forming. Accordingly, the mesh structure 210 thickness $T_m$, the widths $W_m$ of the mesh segments 214, and/or the distances (e.g., $D_r$, $D_c$) between the mesh segments 214 may be optimized to minimize the neutronic penalty imposed by the mesh structure 210 while also ensuring that the mesh structure 210 provides structural support and corrosion resistance to the base tube 102.

In some aspects, the various parameters of the mesh structure 210 described above can be selected and/or optimized such that the portion of the outer surface 106 of the elongated tubular wall 104 that is left uncovered by the gaps 216 of the mesh structure 210 is in a range of 5% to 90% of the total surface area of the outer surface 106 of the elongated tubular wall 104. For example, the portion of the outer surface 106 of the elongated tubular wall 104 that is left uncovered by the gaps 216 of the mesh structure 210 can be 5%, 10%, 15%, 20%, 25%, 30%, 35%, 40%, 45%, 50%, 55%, 60%, 65%, 70%, 75%, 80%, 85%, or 90% of the total surface area of the outer surface 106 of the elongated tubular wall 104.

Figure 5:
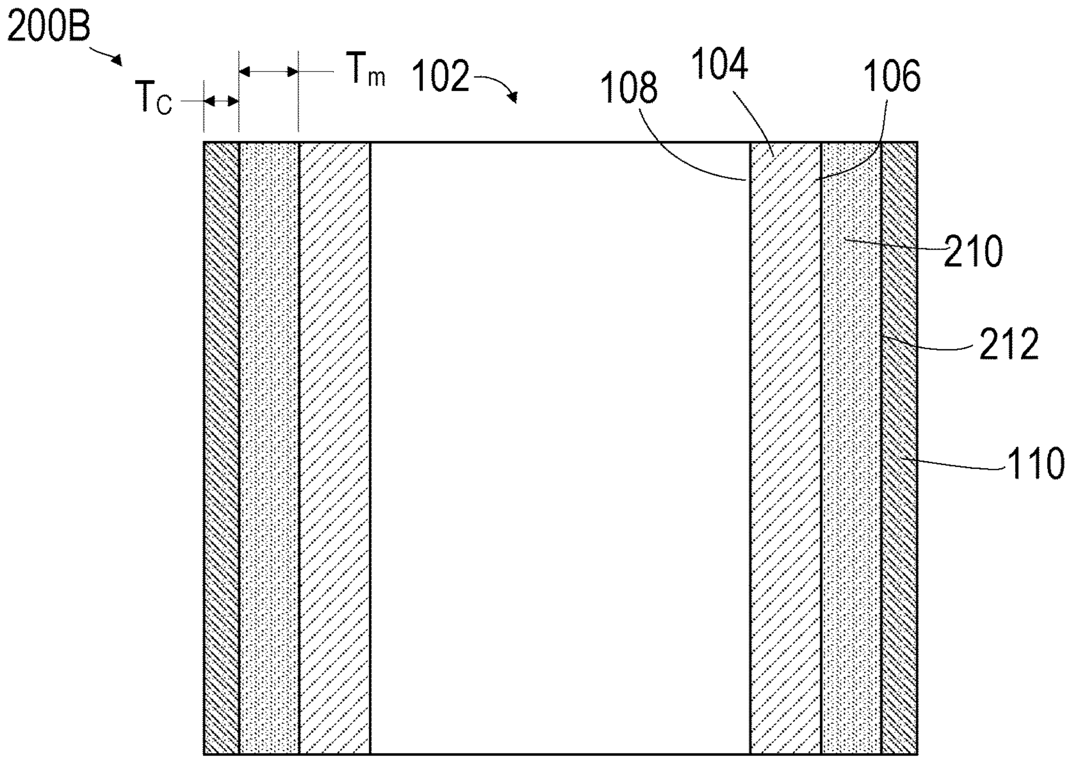
FIG. 5 illustrates a longitudinal cross-sectional view of a portion of a nuclear fuel rod cladding including a base tube, a mesh structure formed on an outer surface of base tube, and an oxidation-resistant coating applied to the outer surface of the mesh structure, according to at least one non-limiting aspect of this disclosure.

In various aspects, the nuclear fuel rod cladding 200 can include both an oxidation-resistant coating 110 and a mesh structure 210. For example, FIG. 5 illustrates a longitudinal cross-sectional view of a portion of a nuclear fuel rod cladding 200B including a base tube 102, a mesh structure 210 formed on an outer surface 106 of the tubular wall 104, and an oxidation-resistant coating 110 applied to the outer surface 212 of the mesh structure 210. Although not shown in the cross-sectional view shown in FIG. 5, the oxidation-resistant coating 110 is also applied to the portions of the outer surface 106 of the tubular wall 104 left uncovered by the gaps of the mesh structure. Thus, the oxidation-resistant coating covers the entire outside surface of the fuel rod cladding 200B.

The various properties of the mesh structure 210 and oxidation-resistant coating 110 of cladding 200B can be similar to those described above with respect to FIGS. 3-4 and 8-10. Thus, the nuclear fuel rod cladding 200B can retain the structural and neutronic-penalty-reducing benefits of having the mesh structure 210 while also retaining the oxidation-resistance benefits of having an oxidation-resistant coating 110 surrounding the entire outside surface of the cladding 200B. Moreover, the thickness $T_m$, widths $W_s$, and/or distances $D_r$, $D_c$ associated with the mesh structure 210 as well as the thickness $T_c$ of the coating 110 can be optimized to achieve these benefits. For example, the mesh structure 210 can be configured to minimize the size of potential oxidation patches and/or ruptures and provide structural support to the base tube 102. Further, the oxidation-resistant coating 110 can be configured with a very small thickness $T_c$ (e.g., about 5-10 microns) to provide corrosion protection to the entire outer surface of the cladding 200B while imposing only a limited neutronic penalty.

The nuclear fuel rod cladding 200B configuration illustrated in FIG. 5 can, in some aspects, have a smoother outer surface compared to the cladding configuration 200A illustrated in FIG. 4. For example, the coating 110 may help to smooth over bumps protruding from the cladding 200B resulting from the mesh structure 210. Thus, the cladding 200B configuration illustrated in FIG. 5 may allow for a larger mesh structure 210 thickness $T_m$ because the coating 110 may help to mitigate potential issues related to roughness and subcooled boiling as liquid coolant flows along the outer surface of the cladding 200B.

The nuclear fuel rod cladding 200B configuration illustrated in FIG. 5 can, in some aspects, employ a mesh structure 210 that does not have oxidation-resistant properties. As mentioned above, the mesh structure 210 of the fuel rod cladding 200B is coated with an oxidation-resistant coating 110. Thus, in some aspects, the mesh structure 210 material used for fuel rod cladding 200B may be selected for structural properties. Any suitable mesh structure 210 material may be selected, such as, for example, the mesh structure 210 materials disclosed above, zirconium alloys, silicon carbide, and/or other ceramics or ceramic composites.

Figure 6:
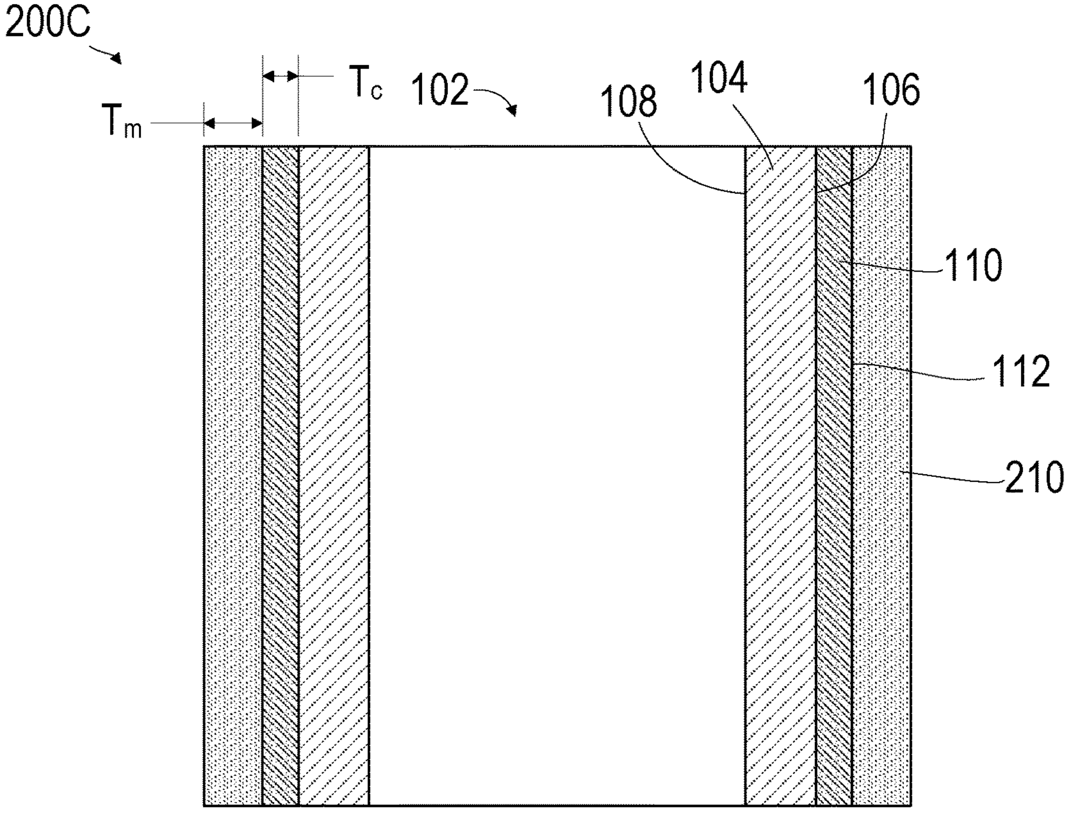
FIG. 6 illustrates a longitudinal cross-sectional view of a portion of a nuclear fuel rod cladding including a base tube, an oxidation-resistant coating applied to the outer surface of the base tube, and a mesh structure formed on the outer surface of the oxidation-resistant coating, according to at least one non-limiting aspect of this disclosure.

FIG. 6 illustrates a longitudinal cross-sectional view of a portion of a nuclear fuel rod cladding 200C including a base tube 102, an oxidation-resistant coating 110 applied to the outer surface 106 of the tubular wall 104, and a mesh structure 210 formed on the outer surface 112 of the oxidation-resistant coating 110. Although not shown in the cross-sectional view shown in FIG. 6, a portion of the oxidation-resistant coating 110 is left uncovered by the gaps 216 of the mesh structure 210.

Referring to FIG. 6, and also to FIGS. 8-10, in some aspects, the portion of the outer surface 112 of the oxidation-resistant coating 110 that is left uncovered by the gaps 216 of the mesh structure 210 is in a range of 5% to 90% of the total surface area of the outer surface 112 of the of the oxidation-resistant coating 110. For example, the portion of the outer surface 112 of the oxidation-resistant coating 110 that is left uncovered by the gaps 216 of the mesh structure 210 can be 5%, 10%, 15%, 20%, 25%, 30%, 35%, 40%, 45%, 50%, 55%, 60%, 65%, 70%, 75%, 80%, 85%, or 90% of the total surface area of the outer surface 112 of the oxidation-resistant coating 110.

The various properties of the mesh structure 210 and oxidation-resistant coating 110 of cladding 200C can be similar to those described above with respect to FIGS. 3-4 and 8-10. Thus, the nuclear fuel rod cladding 200C can retain the structural and neutronic-penalty-reducing benefits of having the mesh structure 210 while also retaining the oxidation-resistance benefits of having an oxidation-resistant coating 110 surrounding the entire base tube 102.

Moreover, the thickness $T_m$, widths $W_m$, and/or distances $D_r$, $D_c$ associated with the mesh structure 210, as well as the thickness $T_c$ of the coating 110 can be optimized to achieve these benefits. For example, the mesh structure 210 can be configured to minimize the size of potential oxidation patches and/or ruptures and provide structural support to the base tube 102. Further, the oxidation-resistant coating 110 can be configured with a very small thickness $T_c$ (e.g., about 5-10 microns) to provide corrosion protection to the entire outer surface 106 of the base tube 102 while imposing only a limited neutronic penalty.

Figure 7:
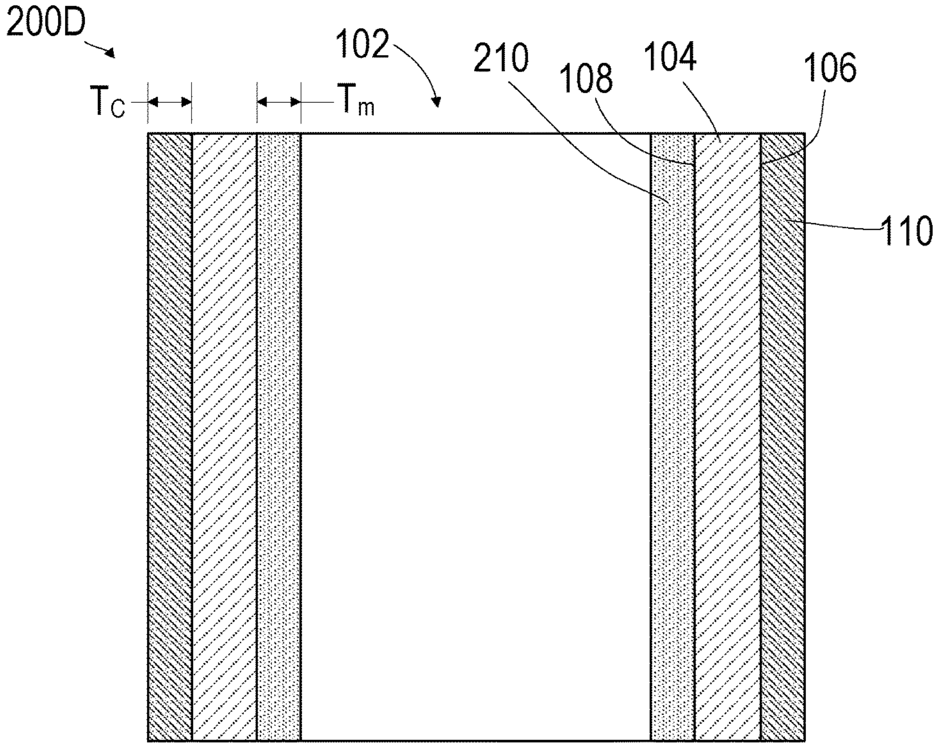
FIG. 7 illustrates a longitudinal cross-sectional view of a portion of a nuclear fuel rod cladding including a base tube, an oxidation-resistant coating applied to the outer surface of the base tube, and a mesh structure formed on the inner surface of the base tube, according to at least one non-limiting aspect of this disclosure.

FIG. 7 illustrates a longitudinal cross-sectional view of a portion of a nuclear fuel rod cladding 200D including a base tube 102, an oxidation-resistant coating 110 applied to the outer surface 106 of the tubular wall 104, and a mesh structure 210 formed on the inner surface 108 of the tubular wall 104.

The various properties of the mesh structure 210 and oxidation-resistant coating 110 of cladding 200D can be similar to those described above with respect to FIGS. 3-4 and 8-10. Thus, the nuclear fuel rod cladding 200C can retain the structural and neutronic-penalty-reducing benefits of having the mesh structure 210 while also retaining the oxidation-resistance benefits of having an oxidation-resistant coating 110 surrounding the entire base tube 102. Moreover, the thickness $T_m$, widths $W_s$, and/or distances $D_r$, $D_c$ associated with the mesh structure 210, as well as the thickness $T_c$ of the coating 110 can be optimized to achieve these benefits. For example, the mesh structure 210 can be configured to provide structural support to the base tube 102 along the internal surface 108 of the tubular wall 104. Further, the oxidation-resistant coating 110 can be configured with a very small thickness $T_c$ (e.g., about 5-10 microns) to provide corrosion protection to the entire outer surface 106 of the base tube 102 while imposing only a limited neutronic penalty.

The nuclear fuel rod cladding 200D configuration illustrated in FIG. 7 can, in some aspects, employ a mesh structure 210 that does not have oxidation-resistant properties. As mentioned above, the mesh structure 210 is formed on the internal surface 108 of the tubular wall 104. Thus, in some aspects, the mesh structure 210 material used for fuel rod cladding 200D may be selected for structural properties. Any suitable mesh structure 210 material may be selected, such as, for example, the mesh structure 210 materials disclosed above, zirconium alloys, silicon carbide, and/or other ceramics or ceramic composites.

Referring now to FIGS. 4-10, the mesh structures 210 disclosed herein can be formed using any suitable technique. For example, various know deposition, additive manufacturing, coating, subtractive manufacturing, and/or reductive techniques can be used to form the mesh structure 210.

In some aspects, cold spray techniques can be used to form the mesh structure 210 on the base tube 102 and/or on the oxidation-resistant coating 110. For example, cold spray may be used to directly apply (e.g., print, spray) mesh segments 214 having a desired pattern to the surface of the base tube 102 and/or the surface of oxidation-resistant coating 110. As another example, a masking material may be applied to the surface of the base tube 102 and/or the surface of the oxidation-resistant coating 110. Cold spray can be used to apply the mesh structure material and the masking material can be removed to form the desired gaps 216 in the mesh structure.

In some aspects, deposition techniques such as physical vapor deposition (PVD) can be used to form the mesh structure on the base tube 102 and/or on the oxidation-resistant coating 110. For example, a masking material may be applied to the surface of the base tube 102 and/or the surface of the oxidation-resistant coating 110. PVD can be used to apply the mesh structure material and the masking material can be removed to form the desired gaps 216 in the mesh structure 210.

In various other aspects, techniques such as chemical vapor deposition (CVD), selective laser melting (SLM), or electric discharge machine (EDM) can be used to form the mesh structure 210. As needed, a masking material can be used to form the desired gaps 216 of the mesh structure 210 pattern. In yet other aspects, the mesh structure material can be deposited to the base tube 102 and a suitable etching technique can be used to form the desired gaps 216 in the mesh structure 210.

Figure 11:
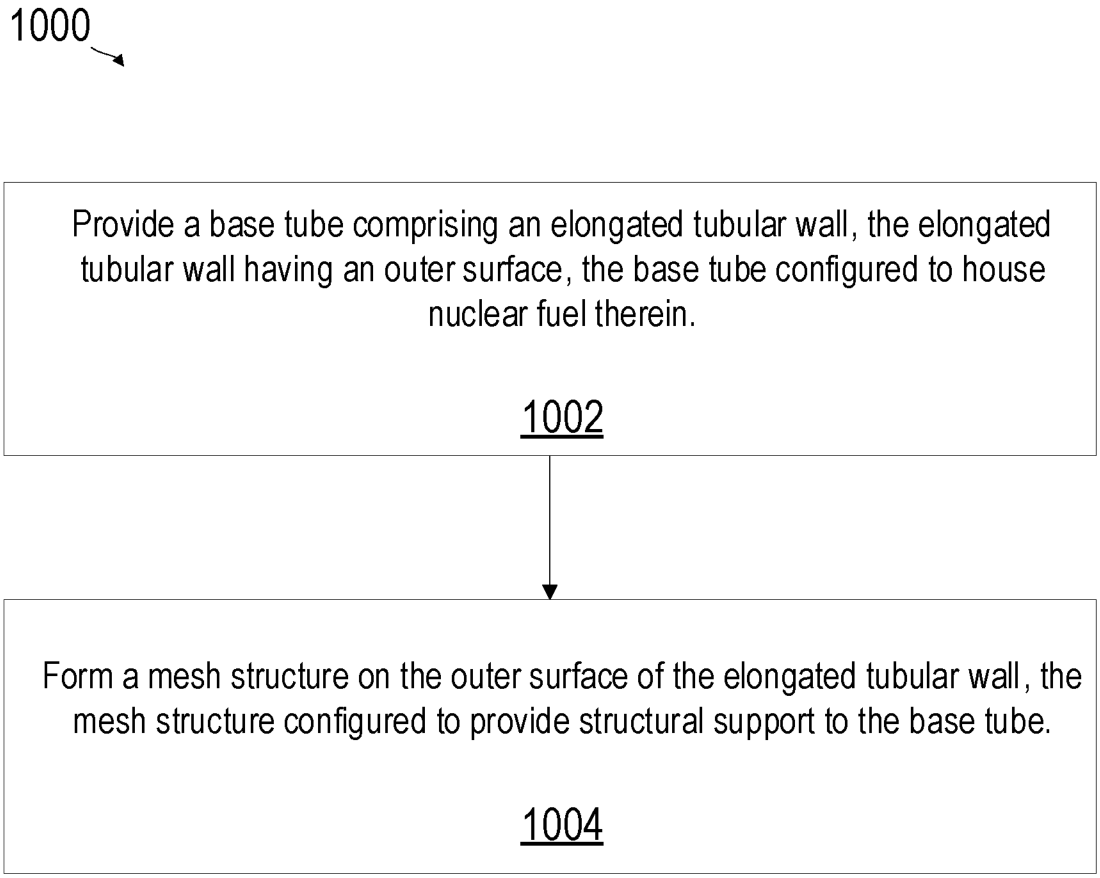
FIG. 11 depicts a flow chart of a method for manufacturing a nuclear fuel rod cladding, according to at least one non-limiting aspect of this disclosure.

Various methods can be employed to manufacture the nuclear fuel rod claddings 100, 200 disclosed herein with respect to FIGS. 3-10. FIG. 11 depicts a flow chart of a method 1000 for manufacturing a nuclear fuel rod cladding, according to at least one non-limiting aspect of this disclosure. Referring primarily to FIG. 11, and also FIGS. 3-10, the method 1000 includes providing 1002 a base tube 102 comprising an elongated tubular wall 104, the elongated tubular wall 104 having an outer surface 106, the base tube 102 configured to house nuclear fuel therein. Further, the method 1000 includes forming 1004 a mesh structure 210 on the outer surface 106 of the elongated tubular wall 104, the mesh structure 210 configured to provide structural support to the base tube 102.

In some aspects of the method 1000, the base tube 102 includes zirconium, iron, or a combination thereof. In other aspects of the method 1000, the cladding comprises chromium, yttrium, iron, or a combination thereof.

In some aspects of the method 1000, forming 1004 the mesh structure comprises forming gaps 216 in the mesh structure, and wherein a portion of the outer surface 106 of the elongated tubular wall 104 is left uncovered by the gaps 216 of the mesh structure 210. In other aspects of the method 1000, the portion of the outer surface 106 of the elongated tubular wall 104 left uncovered by the gaps 216 of the mesh structure 210 is in a range of 5% to 90% of a surface area of the outer surface 106 of the elongated tubular wall 104.

In some aspects, the method 1000 includes applying an oxidation-resistant coating 110 to an outer surface of the mesh structure 210 and a portion of the outer surface 106 of the base tube 102 left uncovered by the gaps 216 of the mesh structure 210.

In some aspects of the method 1000, forming 1004 the mesh structure 210 comprises forming a square pattern, a diamond pattern, a spiral pattern, or a combination thereof. In other aspects of the method 1000, forming 1004 the mesh structure 210 comprises depositing the mesh structure 210 using physical vapor deposition, depositing the mesh structure 210 using cold spray deposition and a masking material, depositing the mesh structure 210 using chemical vapor deposition, or depositing a mesh material and forming gaps 216 in the mesh material using etching.

Various aspects of the devices, systems, and methods described herein are set out in the following examples.

Example 1: A nuclear fuel rod cladding, the nuclear fuel rod cladding comprising: a base tube comprising an elongated tubular wall, the base tube configured to house nuclear fuel therein; and a mesh structure comprising gaps therein, the mesh structure positioned along at least a portion of the elongated tubular wall; wherein the mesh structure is configured to provide structural support to the base tube; and wherein the gaps of the mesh structure are designed to permit neutrons emitted by the nuclear fuel to pass therethrough to escape the fuel rod cladding.

Example 2: The cladding of example 1, wherein the base tube comprises zirconium, iron, or a combination thereof.

Example 3: The cladding of any of examples 1-2, wherein the mesh structure comprises chromium, yttrium, iron, or a combination thereof.

Example 4: The cladding of any of examples 1-3, wherein the mesh structure is formed on an outer surface of the elongated tubular wall, and wherein a portion of the outer surface of the elongated tubular wall is left uncovered by the gaps of the mesh structure.

Example 5: The cladding of any of examples 1-4, wherein the portion of the outer surface of the elongated tubular wall left uncovered by the gaps of the mesh structure is in a range of 5% to 90% of a surface area of the outer surface of the elongated tubular wall.

Example 6: The cladding of any of examples 1-5, further comprising an oxidation-resistant coating applied to an outer surface of the mesh structure and the portion of the outer surface of the base tube left uncovered by the gaps of the mesh structure.

Example 7: The cladding of any of examples 1-6, further comprising an oxidation-resistant coating applied to an outer surface of the elongated tubular wall, wherein the mesh structure is formed on an outer surface of the oxidation resistant coating, and wherein a portion of the oxidation-resistant coating is left uncovered by the gaps of the mesh structure.

Example 8: The cladding of any of examples 1-7, wherein the mesh structure is formed on an inner surface of the elongated tubular wall, and wherein a portion of the inner surface of the elongated tubular wall is left uncovered by the gaps of the mesh structure.

Example 9: The cladding of any of examples 1-8, further comprising an oxidation-resistant coating applied to an outer surface of the elongated tubular wall.

Example 10: The cladding of any of examples 1-9, wherein the mesh structure is configured in a square pattern, a diamond pattern, a spiral pattern, or a combination thereof.

Example 11: The cladding of any of examples 1-10, wherein the mesh structure comprises a plurality of mesh segments, and wherein the mesh segments have a width in a range of 0.5 mm to 3 mm.

Example 12: The cladding of any of examples 1-11, wherein the mesh structure comprises a plurality of mesh segments, and wherein the mesh segments have a thickness in a range of 10 microns to 30 microns.

Example 13: A method for manufacturing a nuclear fuel rod cladding, the method comprising: providing a base tube comprising an elongated tubular wall, the elongated tubular wall having an outer surface, the base tube configured to house nuclear fuel therein; and forming a mesh structure on the outer surface of the elongated tubular wall, the mesh structure configured to provide structural support to the base tube.

Example 14: The method of example 13, wherein the base tube comprises zirconium, iron, or a combination thereof.

Example 15: The method of any of examples 13-14, wherein the cladding comprises chromium, yttrium, iron, or a combination thereof.

Example 16: The method of any of examples 13-15, wherein forming the mesh structure comprises selectively depositing a material in a predefined pattern, and wherein a portion of the outer surface of the elongated tubular wall is left uncovered by gaps of the mesh structure.

Example 17: The method of any of examples 13-16, wherein the portion of the outer surface of the elongated tubular wall left uncovered by the gaps of the mesh structure is in a range of 5% to 90% of a surface area of the outer surface of the elongated tubular wall.

Example 18: The method of any of examples 13-17, further comprising applying an oxidation-resistant coating to an outer surface of the mesh structure and a portion of the outer surface of the base tube left uncovered by the gaps of the mesh structure.

Example 19: The method of any of examples 13-18, wherein the predefined pattern is a square pattern, a diamond pattern, a spiral pattern, or a combination thereof.

Example 20: The method of any of examples 13-19, wherein forming the mesh structure comprises depositing the mesh structure using physical vapor deposition, depositing the mesh structure using cold spray deposition and a masking material, depositing the mesh structure using chemical vapor deposition, or depositing a mesh material and forming gaps in the mesh material using etching.

Example 21: A nuclear fuel rod cladding, the nuclear fuel rod cladding comprising: a base tube comprising an elongated tubular wall, the base tube configured to house nuclear fuel therein; and a porous layer comprising gaps therein, the porous layer positioned along at least a portion of the elongated tubular wall; wherein the porous layer is configured to provide structural support to the base tube; and wherein the gaps of the porous layer are designed to permit neutrons emitted by the nuclear fuel to pass therethrough to escape the fuel rod cladding.

Example 22: The cladding of example 21, wherein the porous layer comprises chromium, yttrium, iron, or a combination thereof.

Example 23: The cladding of any of examples 21-22, wherein the porous layer is formed on an outer surface of the elongated tubular wall, and wherein a portion of the outer surface of the elongated tubular wall is left uncovered by the gaps of the porous layer.

Example 24: The method of any of examples 21-23, wherein the portion of the outer surface of the elongated tubular wall left uncovered by the gaps of the porous layer is in a range of about 5% to about 90% of a surface area of the outer surface of the elongated tubular wall.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A nuclear fuel rod cladding, the nuclear fuel rod cladding comprising:

a base tube comprising an elongated tubular wall, the base tube configured to house nuclear fuel therein, wherein the base tube consists of a zirconium or a zirconium alloy material; and an oxidation-resistant mesh coating comprising mesh segments, wherein the mesh coating is formed directly on an outer surface of the elongated tubular wall, and wherein gaps are defined between the mesh segments corresponding to portions of the outer surface of the tubular wall that are uncoated by the mesh coating;

wherein the mesh coating is configured to limit oxidation formed on the elongated tubular wall to provide structural support to the base tube; and wherein the gaps of the mesh coating are designed to permit neutrons emitted by the nuclear fuel to pass therethrough to escape the fuel rod cladding.

2. The nuclear fuel rod cladding of claim 1, wherein the mesh coating comprises chromium, yttrium, iron, or a combination thereof.

3. The nuclear fuel rod cladding of claim 1, wherein the portions of the outer surface of the tubular wall uncoated by the mesh coating corresponding to the gaps are in a range of about 5% to about 90% of a surface area of the outer surface of the elongated tubular wall.

4. The nuclear fuel rod cladding of claim 1, further comprising an oxidation-resistant coating applied to an outer surface of the mesh coating and the portions of the outer surface of the tubular wall that are uncoated by the mesh coating.

5. The nuclear fuel rod cladding of claim 1, wherein the mesh coating is configured in a square pattern, a diamond pattern, a spiral pattern, or a combination thereof.

6. The nuclear fuel rod cladding of claim 1, wherein the mesh segments have a width in a range of about 0.5 mm to about 3 mm.

7. The nuclear fuel rod cladding of claim 1, wherein the mesh segments have a thickness in a range of 10 microns to 30 microns.

8. A nuclear fuel rod cladding, the nuclear fuel rod cladding comprising:

a base tube comprising an elongated tubular wall, the base tube configured to house nuclear fuel therein, wherein the base tube consists of a zirconium or a zirconium alloy material; and a porous coating directly on an outer surface of the elongated tubular wall, wherein the porous coating comprises pores therein, and wherein the pores define portions of the outer surface of the elongated tubular wall that are uncovered by the porous coating;

wherein the porous coating is configured to limit oxidation formed on the elongated tubular wall to provide structural support to the base tube; and wherein the pores of the porous coating are designed to permit neutrons emitted by the nuclear fuel to pass therethrough to escape the fuel rod cladding.

9. The nuclear fuel rod cladding of claim 8, wherein the porous coating comprises chromium, yttrium, iron, or a combination thereof.

10. The nuclear fuel rod cladding of claim 8, wherein wherein the portions of the outer surface of the elongated tubular wall that are uncovered by the porous coating and are defined by the pores are in a range of about 5% to about 90% of a surface area of the outer surface of the elongated tubular wall.

11. The nuclear fuel rod cladding of claim 3, wherein the portions of the outer surface of the tubular wall uncoated by the mesh coating corresponding to the gaps are in a range of 50% to 90% of a surface area of the outer surface of the elongated tubular wall.

* * * * *